(12) United States Patent
Hall-Goulle et al.

(10) Patent No.: US 6,423,839 B1
(45) Date of Patent: Jul. 23, 2002

(54) MIXED COLOR PIGMENT PRECURSORS AND THEIR USE

(75) Inventors: Véronique Hall-Goulle, Reinach; Gerardus De Keyzer, Riehen, both of (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 0 days.

(21) Appl. No.: 09/532,242

(22) Filed: Mar. 22, 2000

(30) Foreign Application Priority Data

Apr. 16, 1999 (CH) ................................. 702/99

(51) Int. Cl.$^7$ ............................................. C07D 487/22

(52) U.S. Cl. ........................ 540/127; 540/135; 540/140

(58) Field of Search ................................. 540/127, 140, 540/135

(56) References Cited

U.S. PATENT DOCUMENTS

| | | | | |
|---|---|---|---|---|
| 2,351,118 A | | 6/1944 | Haddock | 260/146 |
| 2,351,119 A | | 6/1944 | Hulton | 260/146 |
| 5,066,796 A | * | 11/1991 | Law et al. | 540/140 |
| 6,010,567 A | | 1/2000 | Schadeli et al. | 106/413 |

FOREIGN PATENT DOCUMENTS

| | | |
|---|---|---|
| JP | 63-293090 | 11/1988 |
| WO | 98/45756 | 10/1998 |

OTHER PUBLICATIONS

Chemical Abst. 85–131170/22 of JP 60/67949.
Chemical Abst. 86–039763/06 of JP 60–260674.
Chemical Abst. 89–018484/03 of JP 63/293090.
Derw. Abstract (1985)–131170[2]of XP–002142458.
Derw. Abstract (1989)–018484[29]of XP–002142457.

\* cited by examiner

Primary Examiner—Richard L. Raymond
Assistant Examiner—Kahsay Habte
(74) Attorney, Agent, or Firm—David R. Crichton

(57) ABSTRACT

This invention relates to substituted azophthalocyanine pigment precursors which produce uniform mixed colors when their solubilising groups are eliminated. These compounds are of formula

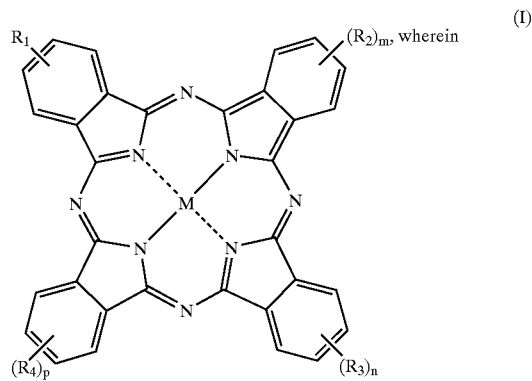

m, n and p are each independently of one another 0 or 1, $R_1$, $R_2$, $R_3$ and $R_4$ are each independently of one another a group of formula

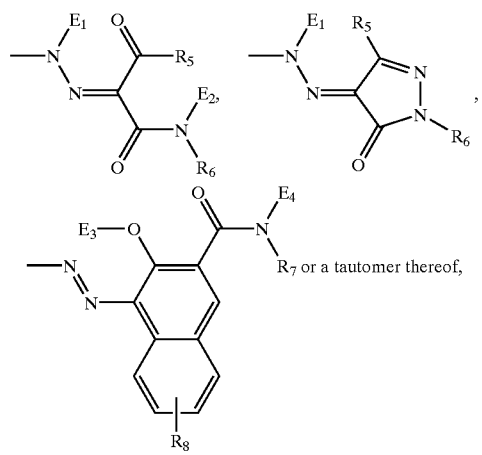

$R_5$ is $C_1$–$C_{12}$alkyl, $C_1$–$C_{12}$alkoxy, cyano or

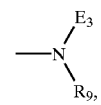

$R_6$, $R_7$ and $R_q$ are H, $E_5$, $C_1$–$C_{12}$alkyl,

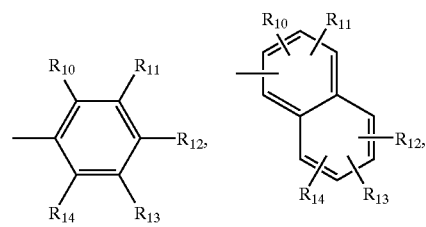

-continued

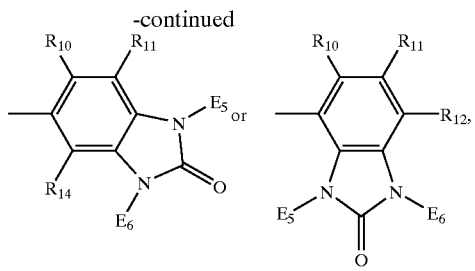

$R_8$ is H, halogen, $C_1$–$C_{12}$alkyl or $C_1$–$C_{12}$alkoxy, $R_{10}$, $R_{11}$, $R_{12}$, $R_{13}$ and $R_{14}$ are each independently of one another H, $C_1$–$C_{12}$alkyl, $C_1$–$C_{12}$-alkoxy, trifluoromethyl, nitro, halogen or

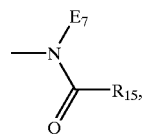

$R_{15}$ is $C_1$–$C_{12}$alkyl, or $C_6$-$C_{10}$aryl which is unsubstituted or substituted by 1 to 3 substituents selected from the group consisting of $C_1$–$C_{12}$alkyl, $C_1$–$C_{12}$alkoxy, trifluoromethyl, nitro and halogen, M is two hydrogen atoms or a divalent metal, oxometal, halogenometal or hydroxymetal, where the divalent metal may be additionally coordinated at one or two identical or different neutral ligands, and $E_1$, $E_2$, $E_3$, $E_4$, $E_5$, $E_6$ and $E_7$ are each independently of one another hydrogen or a group of formula

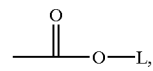

where at least one group $E_1$, $E_2$, $E_3$, $E_4$, $E_5$, $E_6$ or $E_7$ in a group $R_1$, $R_2$, $R_3$ or $R_4$ is not hydrogen, and L is any group suitable for solubilizing.

11 Claims, No Drawings

MIXED COLOR PIGMENT PRECURSORS AND THEIR USE

The present invention relates to substituted azophthalocyanine pigment precursors which produce uniform mixed colours when their solubilising groups are splitted off.

Mixed colour pigmentations are usually produced by the combination of differently coloured pigments. In contrast to more complicated colourants, simple colourants have narrow absorption bands so that their mixtures have high colour saturations at high tinctorial strength when standard pigment dispersion methods are used, for example those customarily used for paint systems and printing inks.

Surprisingly, however, it has been found that the use of known pigment precursors of the phthalocyanine class in admixture with pigment precursors of different colour yields results which are not entirely satisfactory. The shades obtained are markedly duller than expected and depend to an undesirable degree on the elimination conditions. During the formation of the pigments, a substantial proportion of the mass of the molecule is eliminated, which must be disposed of or which may result in changes of the matrix properties, for example in loss of solidity or in inhomogeneities.

Quite unexpectedly, the same mixture yields pigmentations which, depending on the substrate, have different shades, such as for example a shade which is markedly different on wood than on leather, plastics, aluminium oxide, boron nitride or silicium nitride, or which even differs in different photo-sensitive compositions. Correspondingly, composite materials have non-uniform shades. This is a problem in particular for world companies interested in having so-called corporate colours which they may even use as trademarks or in advertising (for example well-known big producers of beverages).

For improvement, substantial expenditure is thus necessary in order to achieve a result on a specific material which is still not fully satisfactory, the advantages of the pigment precursor technology thus being virtually counterbalanced. In addition, the solubility of known pigment precursor mixtures is unsatisfactory so that only partially satisfying tinctorial strengths can be obtained.

WO 98/45756 discloses mixtures of copper phthalocyaninetetrakis(N-tert-butoxycarbonyl)-sulfonic acid hydrazide with an at least equimolar amount of N-substituted Pigment Yellow 109 or Pigment Violet 37. However, these mixtures yield only pigmentations having a less than satisfactory colour saturation and fastness properties, since a not clearly defined, inferior product mixture is obtained instead of the desired copper phthalocyaninetetrasulfonic acid hydrazide.

U.S. Pat. No. 2,351,119 discloses violet and green colourants of the phthalocyanine series which are substituted by azo groups and which may be used in paint systems or printing inks. According to JP 60/67949, analogous products are suitable as photoreceptors and, according to JP 60/260674, as infrared absorbers and, according to JP 63/293090, as optical recording materials.

JP-A-63/293090 discloses optical recording materials containing compounds, some of which contain 3-hydroxy-2-naphtoic acid amide as partial structure. However, these materials can only be used in the infrared range as their sensitivity to a visible laser beam (400–700 nm) is too low and as furthermore the reflectivity of the solid does not change enough during irradiation.

Although these sparingly soluble colourants of the phthalocyanine series have been known for several decades, they have to date neither been converted into a useful pigmentary form nor have they been used as pigments in practice.

Surprisingly, it has now been found that novel compounds containing this chromophore can be excellently used as pigment precursors for mixed colour pigmentations. The pigmentations obtainable therefrom are surprisingly more uniformly coloured, even on different materials or on composite materials, and also have a higher colour saturation than pigmentations starting from known mixtures of pigment precursors of different colours.

The novel compounds are additionally also distinguished by a surprisingly high solubility in customary solvents. In spite of the higher molecular weight, fewer and/or smaller solubilising groups are required than in the case of the pigment precursor mixtures known so far. Because of this, it is advantageous if less mass is eliminated per weight unit to obtain the pigment, and it is also possible to obtain pigmentations of higher tinctorial strength.

Mixed colours are understood to mean coloured pigments which have absorption maxima in two of the three spectral ranges 400–500 nm, 500–600 nm and 600–700 nm, and the maximum transmission of which is in the third of these spectral ranges. Owing to the structure of the novel compounds there is usually at least one absorption maximum at 600–700 nm and a maximum transmission in the range of 400–600 nm. Preferred mixed colours are green, violet and brown, particularly preferably green.

Accordingly, this invention relates to a compound of formula

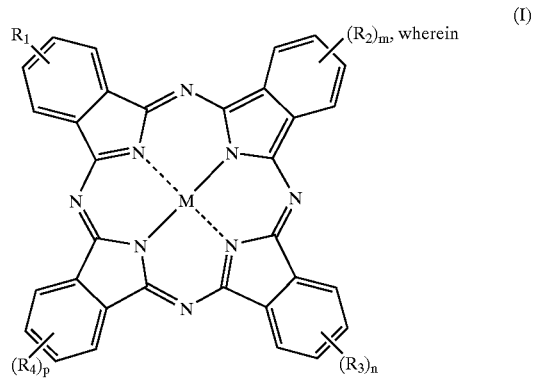

(I)

m, n and p are each independently of one another 0 or 1, $R_1$, $R_2$, $R_3$ and $R_4$ are each independently of one another a group of formula

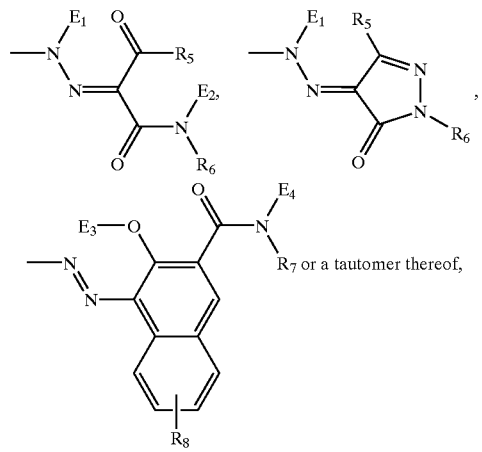

$R_7$ or a tautomer thereof, $R_5$ is $C_1$–$C_{12}$alkyl, $C_1$–$C_{12}$alkoxy, cyano or

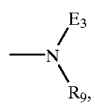

$R_6$, $R_7$ and $R_q$ are H, $E_5$, $C_1$–$C_{12}$alkyl,

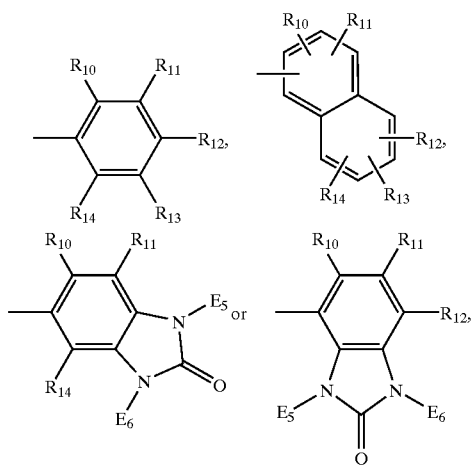

$R_8$ is H, halogen, $C_1$–$C_{12}$alkyl or $C_1$–$C_{12}$alkoxy,
$R_{10}$, $R_{11}$, $R_{12}$, $R_{13}$ and $R_{14}$ are each independently of one another H, $C_1$–$C_{12}$alkyl, $C_1$–$C_{12}$-alkoxy, trifluoromethyl, nitro, halogen or

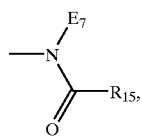

$R_{15}$ is $C_1$–$C_{12}$alkyl, or $C_6$–$C_{10}$aryl which is unsubstituted or substituted by 1 to 3 substituents selected from the group consisting of $C_1$–$C_{12}$alkyl, $C_1$–$C_{12}$alkoxy, trifluoromethyl, nitro and halogen, M is two hydrogen atoms or a divalent metal, oxometal, halogenometal or hydroxymetal, where the divalent metal may be additionally coordinated at one or two identical or different neutral ligands, and $E_1$, $E_2$, $E_3$, $E_4$, $E_5$, $E_6$ and $E_7$ are each independently of one another hydrogen or a group of formula

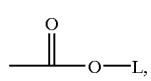

where at least one group $E_1$, $E_2$, $E_3$, $E_4$, $E_5$, $E_6$ or $E_7$ in a group $R_1$, $R_2$, $R_3$ or $R_4$ is not hydrogen, and L is any group suitable for solubilising.

Divalent metals are, for example, Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II) or Pb(II). Divalent oxometals are, for example, V(IV)O, Mn(IV)O, Zr(IV)O or Ti(IV)O. Divalent halogenometals are, for example, Fe(III)Cl, In(III)Cl or Ce(III)Cl. Divalent hydroxymetals are, for example, Al(III)OH, Cr(III)OH, Bi(III)OH or Zr(IV)(OH)$_2$.

Neutral ligands are understood to mean molecules containing at least one heteroatom selected from the group consisting of N, O, P and S. Ligands suitable for metal phthalocyanines are known.

In tautomers, $E_1$, $E_2$, $E_3$, $E_4$, $E_5$, $E_6$ and/or $E_7$ are bound to another N— or O-atom, which entails the shifting of double bonds.

m, n and p are preferably all 1.

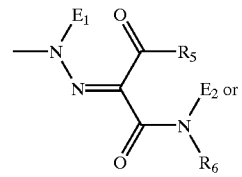

$R_1$, $R_2$, $R_3$ and $R_4$ are each preferably a group of formula

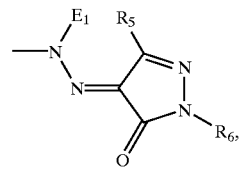

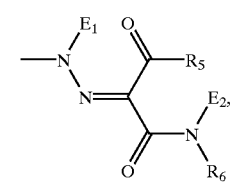

particularly preferably a group of formula
$R_5$ is preferably $C_1$–$C_{12}$alkyl, more preferably methyl.
$R_6$ is preferably H, $E_5$, methyl, ethyl, branched $C_3$–$C_8$alkyl,

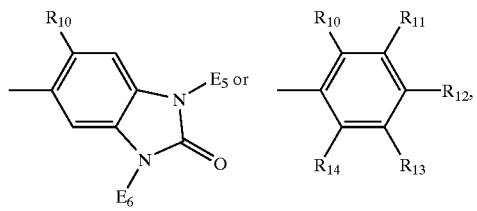

particularly preferably H, methyl, tertiary $C_4$–$C_8$alkyl or phenyl.
$R_7$ is preferably methyl, tertiary $C_4$–$C_8$alkyl or, particularly preferably,

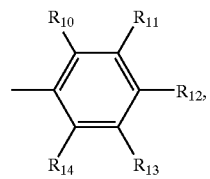

$R_8$ is preferably H or methoxy, particularly preferably H.
$R_{10}$, $R_{11}$, $R_{12}$, $R_{13}$ and $R_{14}$ are preferably H, $C_1$–$C_4$alkyl, $C_1$–$C_4$alkoxy, nitro or halogen, particularly preferably H.

$R_{15}$ is preferably $C_1$–$C_4$alkyl, or phenyl which is unsubstituted or substituted by $C_1$–$C_4$alkyl, $C_1$–$C_4$alkoxy, nitro or halogen; methyl or phenyl are particularly preferred.

M is preferably $H_2$, Cu(II), Zn(II), Fe(II), Ni(II), Pd(II), Mn(II), Mg(II), Co(II), Pb(II) or Al(III)OH, particularly preferably $H_2$, Cu(II), Zn(II), Fe(II), Ni(II), Pd(II), Co(II) or Pb(II), very particularly preferably Cu(II) or Ni(II), most preferably Cu(II). The divalent metal is preferably not coordinated with any additional ligand.

L is preferably a group of formula

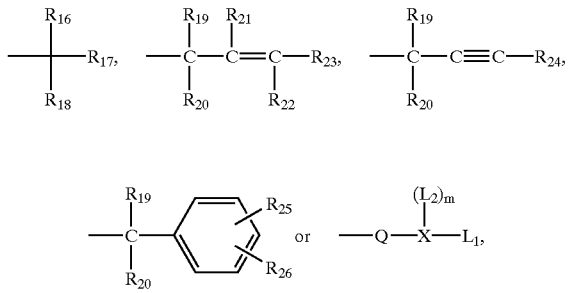

wherein $R_{16}$, $R_{17}$ and $R_{18}$ are each independently of one another $C_1$–$C_6$alkyl, $R_{19}$ and $R_{20}$ are each independently of the other $C_1$–$C_6$alkyl; $C_1$–$C_6$alkyl which is interrupted by O, S or $N(R_{27})_2$; phenyl or biphenyl which is unsubstituted or substituted by $C_1$–$C_6$alkyl, $C_1$–$C_6$-alkoxy, halogen, cyano or nitro, $R_{21}$, $R_{22}$ and $R_{23}$ are each independently of one another hydrogen or $C_1$–$C_6$alkyl, $R_{24}$ is hydrogen, $C_1$–$C_6$alkyl or a group of formula

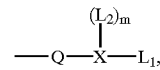

$R_{25}$ and $R_{26}$ are each independently of the other hydrogen, $C_1$–$C_6$alkyl, $C_1$–$C_6$alkoxy, halogen, cyano, nitro, $N(R_{27})_2$; phenyl which is unsubstituted or substituted by halogen, cyano, nitro, $C_1$–$C_6$alkyl or $C_1$–$C_6$alkoxy, $R_{27}$ and $R_{28}$ are $C_1$–$C_6$alkyl, $R_{29}$ is hydrogen or $C_1$–$C_6$alkyl, and $R_{30}$ is hydrogen, $C_1$–$C_6$alkyl, unsubstituted or $C_1$–$C_6$alkyl-substituted phenyl, Q is p,q-$C_2$–$C_6$alkylene which is unsubstituted or mono- or polysubstituted $C_1$–$C_6$alkoxy, $C_1$–$C_6$alkylthio or $C_2$–$C_{12}$dialkylamino, p and q being different position numbers, X is a heteroatom selected from the group consisting of N, O or S, wherein m, if X=O or S, is the number 0 and, if X=N, is the number 1, and $L_1$ and $L_2$ are each independently of the other $C_1$–$C_6$alkyl or [-(p',q'-$C_2$–$C_6$alkylene)-Z-]$_n$—$C_1$–$C_6$alkyl, each of which is unsubstituted or mono- or polysubstituted by $C_1$–$C_{12}$alkoxy, $C_1$–$C_{12}$alkylthio, $C_2$–$C_{24}$dialkylamino, $C_6$–$C_{12}$aryloxy, $C_6$–$C_{12}$arylthio, $C_7$–$C_{24}$alkylarylamino or $C_{12}$–$C_{24}$diarylamino, wherein n is a number from 1 to 1000, p' and q' are different position numbers, each Z is independently of the others a heteroatom O, S or $C_1$–$C_{12}$alkyl-substituted N, and $C_2$–$C_6$alkylene may be identical or different in the repeating units [—$C_2$–$C_6$alkylene-Z—], and $L_1$ and $L_2$ may be saturated or unsaturated 1 to 10 times and may be uninterrupted or interrupted at any position by 1 to 10 groups selected from the group consisting of —(C=O)— and —$C_6H_4$—, and may carry no, or from 1 to 10, additional substituents selected from the group consisting of halogen, cyano or nitro.

Particularly interesting compounds are those of formula (I), wherein L is $C_1$–$C_6$alkyl, $C_2$–$C_6$-alkenyl or

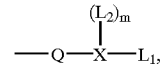

wherein Q is $C_2$–$C_4$alkylene, and $L_1$ and $L_2$ are [—$C_2$–$C_{12}$alkylene-Z-]$_n$—$C_1$–$C_{12}$alkyl, or $C_1$–$C_{12}$alkyl which is mono- or polysubstituted by $C_1$–$C_{12}$alkoxy, $C_1$–$C_{12}$alkylthio or $C_2$–$C_{24}$dialkylamino, and m and n are as defined above.

Very particularly interesting compounds are those of formula (I), wherein L is $C_4$–$C_5$alkyl, $C_3$–$C_6$alkenyl or $$-Q-\overset{\overset{(L_2)_m}{|}}{X}-L_1,$$

wherein Q is $C_2$–$C_4$alkylene, X is O, and m is 0, and $L_1$ is [—$C_2$–$C_{12}$alkylene-O—]$_n$—$C_1$–$C_{12}$alkyl, or $C_1$–$C_{12}$alkyl which is mono- or polysubstituted by $C_1$–$C_{12}$alkoxy, in particular those, wherein —Q—X— is a group of formula —C(CH$_3$)$_2$—CH$_2$—O—.

Alkyl or alkylene may be straight-chain, branched, monocyclic or polycyclic.

$C_1$–$C_{12}$Alkyl is thus, for example, methyl, ethyl, n-propyl, isopropyl, n-butyl, sec-butyl, isobutyl, tert-butyl, cyclobutyl, n-pentyl, 2-pentyl, 3-pentyl, 2,2-dimethylpropyl, cyclopentyl, cyclohexyl, n-hexyl, n-octyl, 1,1,3,3-tetramethylbutyl, 2-ethylhexyl, nonyl, trimethylcyclohexyl, decyl, menthyl, thujyl, bornyl, 1-adamantyl, 2-adamantyl or dodecyl.

If $C_2$–$C_{12}$alkyl is mono- or polyunsaturated, it is $C_2$–$C_{12}$alkenyl, $C_2$–$C_{12}$alkynyl, $C_2$–$C_{12}$alkapolyenyl or $C_2$–$C_{12}$alkapolyinyl, it being possible for two or more double bonds to be isolated or conjugated, for example vinyl, allyl, 2-propen-2-yl, 2-buten-1-yl, 3-buten-1-yl, 1,3-butadien-2-yl, 2-cyclobuten-1-yl, 2-penten-1-yl, 3-penten-2-yl, 2-methyl-1-buten-3-yl, 2-methyl-3-buten-2-yl, 3-methyl-2-buten-1-yl, 1,4-pentadien-3-yl, 2-cyclopenten-1-yl, 2-cyclohexen-1-yl, 3-cyclohexen-1-yl, 2,4-cyclohexadien-1-yl, 1-p-menthen-8-yl, 4(10)-thujen-10-yl, 2-norbornen-1-yl, 2,5-norbornadien-1-yl, 7,7-dimethyl-2,4-norcaradien-3-yl, or the different isomers of hexenyl, octenyl, nonenyl, decenyl or dodecenyl.

$C_2$–$C_4$Alkylene is, for example, 1,2-ethylene, 1,2-propylene, 1,3-propylene, 1,2-butylene, 1,3-butylene, 2,3-butylene, 1,4-butylene or 2-methyl-1,2-propylene. $C_5$–$C_{12}$Alkylene is, for example, an isomer of pentylene, hexylene, octylene, decylene or dodecylene.

$C_1$–$C_{12}$Alkoxy is O—$C_1$–$C_{12}$alkyl, preferably O—$C_1$–$C_4$alkyl.

$C_6$–$C_{12}$Aryloxy is O—$C_6$–$C_{12}$aryl, for example phenoxy or naphthoxy, preferably phenoxy.

$C_1$–$C_{12}$Alkylthio is S—$C_1$–$C_{12}$alkyl, preferably S—$C_1$–$C_4$alkyl.

$C_6$–$C_{12}$Arylthio is S—$C_6$–$C_{12}$aryl, for example phenylthio or naphthylthio, preferably phenylthio.

$C_2$–$C_{24}$Dialkylamino is $N(alkyl_1)(alkyl_2)$, the sum of the carbon atoms in the two groups $alkyl_1$ and $alkyl_2$ being from 2 to 24, preferably $N(C_1$–$C_4alkyl)$—$C_1$–$C_4alkyl$.

$C_7$–$C_{24}$Alkylarylamino is $N(alkyl_1)(aryl_2)$, the sum of the carbon atoms in the two groups $alkyl_1$ and $aryl_2$ being from 7 to 24, for example methylphenylamino, ethyinaphthylamino or butyl-phenanthrylamino, preferably methylphenylamino or ethylphenylamino.

$C_{12}$–$C_{24}$Diarylamino is $N(aryl_1)(aryl_2)$, the sum of the carbon atoms in the two groups $aryl_1$ and $aryl_2$ being from 12 to 24, for example diphenylamino or phenylnaphthylamino, preferably diphenylamino.

Halogen is chloro, bromo, fluoro or iodo, preferably fluoro or chloro, particularly preferably chloro.

n is preferably a number from 1 to 100, particularly preferably a number from 2 to 12.

The novel compounds of formula (I) can be prepared starting from known aminophthalocyanines according to or analogously to known methods, for example by diazotisation, coupling and reaction in the desired molar ratio with a pyrocarboxylic acid diester of formula

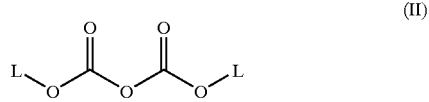

(II)

in an aprotic organic solvent in the presence of a base as catalyst, according to or in analogy to the methods known, inter alia, from WO 98/45756, CH 2585/98 or one of the references provided therein.

The respective molar ratio depends on the number of the radicals L to be introduced. The dicarbonate is conveniently used in excess.

Suitable aprotic organic solvents and bases suitable as catalysts are known, inter alia, from WO 98/45756. The organic N-bases are preferred, for example diazabicyclooctane, diazabicycloundecene and, in particular, 4-dimethylaminopyridine. Highly polar solvents are preferred, for example dimethylacetamide and dimethylformamide.

The suitable pyrocarboxylic acid diesters of formula (II) can be prepared in analogy to generally known methods. Most of the chemicals required therefor are known and are often commercially available and may in any case be prepared according to or in analogy to methods known per se.

Depending on the stoichiometry, soluble pigment derivatives are obtained during the reaction which have a different number of L groups. However, it is not necessary that all H of the —NH— groups are replaced with $CO_2L$. On the contrary, it is often advantageous if part of the —NH— group remains unchanged. If the pigment additionally contains besides the —NH— groups one or more than one phenolic —OH group, then it is also possible and quite acceptable for the purpose of this invention to partially or completely react them with the pyrocarboxylic acid diester of formula (II) to yield the —O—$CO_2$—L groups.

The compounds of formula (I) can also be prepared from other compounds of formula (I) by methods known per se, for example by exchanging a metal, oxometal, halogenometal or hydroxymetal by another metal, oxometal, halogenometal or hydroxymetal, by demetalising a compound of formula (I), or by metalising a metal-free compound of formula (I).

Besides the advantages mentioned above, the novel compounds have additional advantages in some areas of application. They can, for example, be easily prepared in very high purity which affords essential advantages in advanced technologies or which makes their use therein possible at all. In the case of materials, for example, which are used in electronic devices, such as colour filters for liquid crystal displays, completely halogen-free pigmentations can be obtained. An optimum colour can in this case be obtained substantially independently from the matrix used, preferably in the range from x=0.305±0.015/y=0.63±0.04 (green) according to the x,y chromaticity diagram (CIE 1931) under irradiation using a light source having emission bands at 450, 545 and 610 nm (for example of the type F1). Extremely interesting shades with this respect are surprisingly found in the case of the compounds of formula (III), obtainable from the compounds of formula (I), wherein M is Ni, which compounds are still novel.

The shade of the pigments obtained from the novel compounds corresponds substantially better to expectations than was possible until now, for example in finely porous materials such as wood. The pigments furthermore have a stable crystal lattice and a very high chemical stability as well as excellent fastness to light and weathering.

The elimination of the novel compounds to give colourants in pigment form can be achieved most simply, by treating the materials containing the soluble pigment derivatives by heat (heating to 50 to 250° C., preferably to 100 to 200° C.). In some cases the presence of a catalyst, for example an acid or a latent acid, may be found to be advantageous when converting the soluble pigment derivatives back to the pigments by means of heat.

The heating time is usefully in the range from 1 minute to 100 hours.

The elimination reaction to yield the pigment form can, for example, be carried out during the processing of a mixture of the material to be dyed in the mass and of on or several of the novel compounds, for example by extrusion or injection moulding. It is also possible to proceed as disclosed in EP-A-892018.

Accordingly, this invention relates to a process for the preparation of a compound of formula

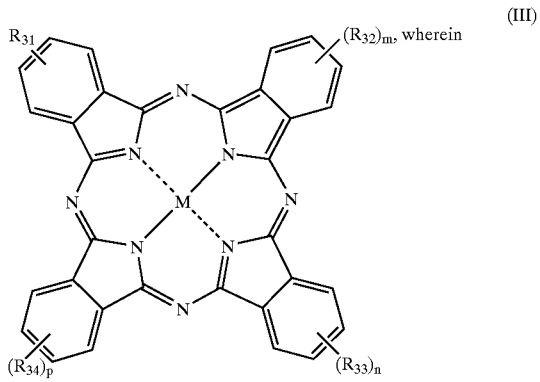

(III)

m, n and p are each independently of one another 0 or 1, $R_{31}$, $R_{32}$, $R_{33}$ and R34 are each independently of one another a group of formula

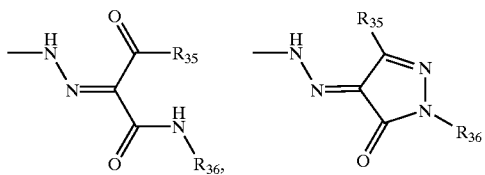

or a tautomer thereof, $R_{35}$ is $C_1$–$C_{12}$alkyl, $C_1$–$C_{12}$alkoxy, cyano or $NHR_{39}$,
$R_{36}$, $R_{37}$ and $R_{39}$ are H, $C_1$–$C_{12}$alkyl,

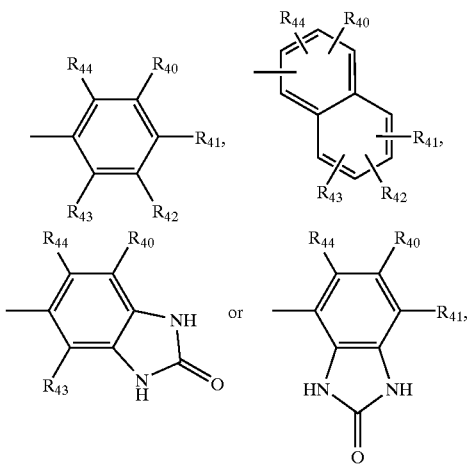

$R_{38}$ is H, halogen, $C_1$–$C_{12}$alkyl or $C_1$–$C_{12}$alkoxy,
$R_{40}$, $R_{41}$, $R_{42}$, $R_{43}$ and $R_{44}$ are each independently of one another H, $C_1$–$C_{12}$alkyl, $C_1$–$C_{12}$-alkoxy, trifluoromethyl, nitro, halogen or

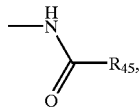

$R_{45}$ is $C_1$–$C_{12}$alkyl, or $C_6$–$C_{10}$aryl which is unsubstituted or substituted by 1 to 3 substituents selected from $C_1$–$C_{12}$alkyl, $C_1$–$C_{12}$alkoxy, trifluoromethyl, nitro and halogen, and M is two hydrogen atoms or a divalent metal, oxometal, halogenometal or hydroxymetal, it being possible for the divalent metal to be additionally coordinated at one or two identical or different neutral ligands, which comprises heating a material containing in the mass or in its pores a compound of formula (I), or which is coated on its surface with a compound of formula (I), to 50 to 250° C.

Said material may be any material, for example a high molecular weight material having a molecular weight of about $10^3$ to $10^7$ g/mol (for example a plastic, paint system or a printing ink), a structurable radiation-sensitive composition (photoresist) or, in particular, a porous material as described, inter alia, in WO 98/58027, or also a metal oxide.

Preferred high molecular weight materials are structures produced from irradiation-sensitive compositions which may be used, for example, as colour filters, wood, leather and oxides of elements of the groups 2, 3, 4, 12, 13 and 14 (IUPAC) of the Periodic System, or their mixtures, particularly preferably oxides of Al, Si, Zr, Mg or Ti, such as eloxated aluminium alloys.

The pigment particles produced in or on one of these materials preferably have an average particle size from 0.01 to 0.05 μm.

The novel compounds of formula (I) can also be converted in solution into pigments which may be used, for example, for the mass coloration of high molecular weight materials.

This invention therefore also relates to a process for the preparation of a compound of formula

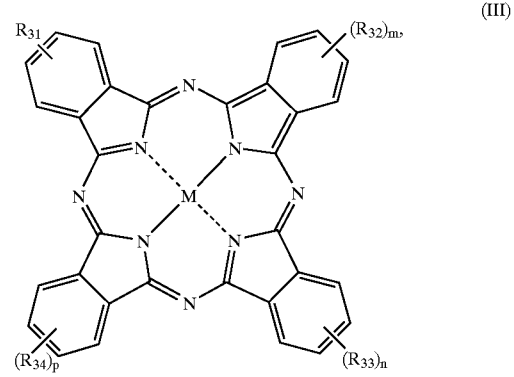

which comprises heating a solution of 0.01 to 99% by weight of the compound of formula (I) in a solvent to 50 to 250° C.

Solvents which may be used are, for example, water, carbon tetrachloride or standard organic solvents, or also the mixtures thereof.

The compounds of formula (III) produced in solution are obtained in homogeneous form in an advantageously pure, crystalline and pigmentary form and preferably have an average particle size of 0.05 to 0.5 μm. They can be isolated in a manner known per se, for example by filtration and subsequent washing with water or a solvent, if necessary. In contrast to the process used to date, the subsequent washing can be advantageously reduced to a minimum or may even be foregone completely.

Where appropriate, it is possible to carry out heating under pressure in order to achieve a temperature higher than the boiling point of the solvent to be used. The heating time is usefully in the range from 10 minutes to 200 hours, a heating time longer than the minimum time required for the reaction being of advantage since the particles first produced recrystallise during that time after the reaction, thus acquiring better pigment properties.

The compounds of formula (I), wherein $R_6$ is

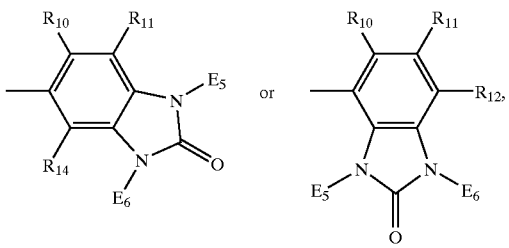

are distinguished by an advantageous, surprisingly low temperature at which the corresponding pigments of formula (III may be formed.

In addition, it is possible to achieve in optical recording materials higher sensitivity, better resolution and less jitter than with the compounds most closely comparable to date. It is, in particular, possible to work with a laser source of shorter wavelength, for example a He/Ne, Kr, GaAsAl, InGaAIP, GaAs, HeCd or Ar laser of a wavelength of 600–680 nm or of 400–500 nm, so that a higher recording density can be achieved. The novel compounds are preferably present in the optical recording material as a solid layer, in pure form or in combination with additives such as a known melting point depressant or activator.

Accordingly, this invention relates to an optical recording material, the recording layer of which essentially consists of a compound of formula (I).

The preparation of recording materials and suitable recording procedures are known per se and can be carried out, for example, as disclosed in U.S. Pat. No. 5,871,882 WO 98/14520 or WO 98/28737, the contents of which are included herein by reference.

This invention also relates to a compound of formula

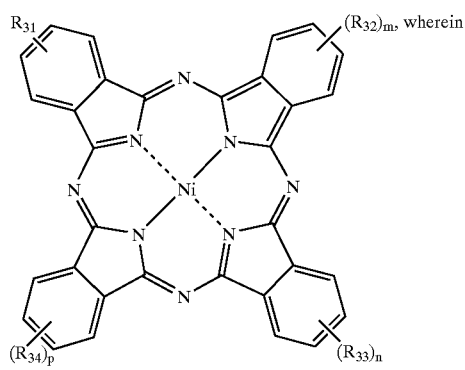

(IV)

m, n and p are each independently of one another 0 or 1, $R_{31}$, $R_{32}$, $R_{33}$ and R34 are each independently of one another a group of formula

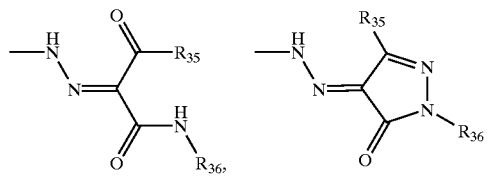

or a tautomer thereof, $R_{35}$ is $C_1$–$C_{12}$alkyl, $C_1$–$C_{12}$alkoxy, cyano or $NHR_{39}$, $R_{36}$, $R_{37}$ and $R_{39}$ are H, $C_1$–$C_{12}$alkyl,

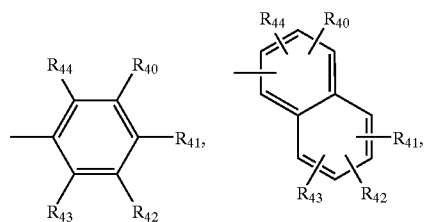

-continued

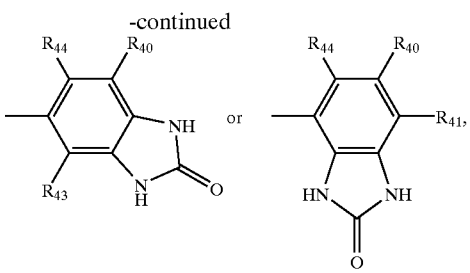

$R_{38}$ is H, halogen, $C_1$–$C_{12}$alkyl or $C_1$–$C_{12}$alkoxy, $R_{40}$, $R_{41}$, $R_{42}$, $R_{43}$ and $R_{44}$ are each independently of one another H, $C_1$–$C_{12}$alkyl, $C_1$–$C_{12}$-alkoxy, trifluoromethyl, nitro, halogen or

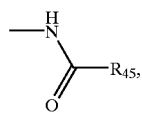

and $R_{45}$ is $C_1$–$C_{12}$alkyl, or $C_6$–$C_{10}$aryl which is unsubstituted or substituted by 1 to 3 substituents selected from the group consisting of $C_1$–$C_{12}$alkyl, $C_1$–$C_{12}$alkoxy, trifluoromethyl, nitro and halogen.

Finally, the novel compounds may be used with undreamt-of advantages in the commonly known photodynamic therapy (PDT), regarding which we refer to Chemie in unserer Zeit 33/2, 84–94 (1999), Photodyn. Tumor ther. 63–73 (1998), Nachr. Chem. techn. Lab. 46/10, 943–948 (1998) and Prog. React. Kinet. 22/3–4, 175–300 (1997) and to the references therein, or analogously to it in applications for cosmetic purposes. The combination of the novel compounds of formula (I) or (IV) with an electromagnetic source of radiation having, for example, a wavelength of 350 to 1000 nm, is surprisingly more effective than combinations used hitherto, making it possible to use lower doses of radiation. This invention thus also relates to the use of electromagnetic irradiation for changing organic material, which is characterised in that the organic material to be changed contains a compound of formula (I) or (IV).

The material to be changed can be, for example, a tissue, preferably vegetable or non-vegetable, e.g. animal or human, cells. The compound of formula (I) or (IV) can then enter into the cells to be treated in per se standard manner, for example intravenously or through a liniment applied thereon. However, the material may be any other material, for example leather, wood or a polymer. The irradiation destroys e.g. a site of the material which contains the compound of formula (I) or (IV), while adjacent sites not containing any compound of formula (I) or (IV) remain unchanged. Thus it is possible, for example, to realise finest perforations.

The following non-limitative Examples illustrate the invention in more detail:

EXAMPLES 1–10

In analogy to U.S. Pat. No. 2,351,119, tetraamino-metal-phthalocyanines are diazotised and the diazonium compound so obtained is coupled with acetoacetanilides of formula

| Example | Metal | R |
|---------|-------|---|
| 1 | Cu | phenyl |
| 2 | Cu | 4-chlorophenyl |
| 3 | Cu | 2-methoxyphenyl |
| 4 | Cu | 5-methylbenzimidazol-2(3H)-one-yl |
| 5 | Cu | 4-chloro-2-methoxyphenyl (CH$_3$O) |
| 6 | Cu | —H |
| 7 | Cu | —CH$_3$ |
| 8 | Cu | -tert-C$_4$H$_9$ |
| 9 | Ni | -tert-C$_4$H$_9$ |
| 10 | Ni | —H |

EXAMPLE 11

A suspension of 11 g of the product according to Example 1 in 120 ml of dimethylacetamide is charged with 0.86 g of N,N-dimethylaminopyridine and 15.2 g of di-tert-butyidicarbonate. After 18 h, the reaction mixture is filtered through some MgSO$_4$ and the filtrate is concentrated by evaporation to about 30 ml. The crude product is precipitated with water, collected by filtration, washed with 200 ml of hexane, dried and dissolved in dichloromethane. After filtration through silica gel, the product is again concentrated and some hexane is added. The product is then subjected to filtration and dried, yielding 13.35 g (94% of theory) of a green powder.

UV/VIS (tetrahydrofuran): $\lambda_{max}$=682 nm, $\epsilon$=60689.

Elemental analysis [%]: theor.: C, 61.75; H, 4.73; N, 15.66; O, 14.31; Cu, 3.55; C$_{92}$H$_{84}$N$_{20}$O$_{16}$Cu found: C, 61.06; H, 5.03; N, 15.28;O, 14.55; Cu, 3.60.

TGA (heating rate 10° C./min): turning point of the degradation=171° C.; loss in mass 25.6%; the product reconverts to the product according to Example 1.

EXAMPLE 12

A suspension of 2 g of the product according to Example 2 in 100 ml of dimethylacetamide is charged with 0.15 g of N,N-dimethylaminopyridine and 2.5 g of di-tert-butyldicarbonate. After 18 h, the reaction mixture is filtered through some Hyflo Supercel™ and the filtrate is concentrated to dryness. The crude product is precipitated with water, collected by filtration, washed with water and dried, yielding 2.4 g of a green powder.

UV/VIS (tetrahydrofuran): $\lambda_{max}$=685 nm.

Elemental analysis [%]: theor.: C, 57.34; H, 4.18; N, 14.54; O, 13.28; Cl, 7.36; Cu, 3.30; C$_{92}$H$_{80}$N$_{20}$O$_{16}$Cl$_4$Cu found: C, 57.16; H, 4.46; N, 14.72; O, 12.68; Cl, 6.80; Cu, 3.44.

TGA (heating rate 10° C./min): turning point of the degradation=164° C.; the product reconverts to the product according to Example 2.

EXAMPLE 13

The procedure is carried out in analogy to Example 12, but replacing di-tert-butyldicarbonate with an equivalent amount of

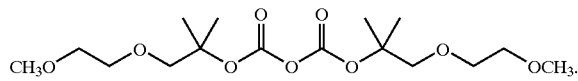

This yields 2.4 g (83% of theory) of a green powder.

UV/VIS (N-methylpyrrolidone): $\lambda_{max}$=685 nm.

TGA (heating rate 10° C./min): turning point of the degradation=186° C.; the product reconverts to the product according to Example 2.

EXAMPLE 14

A suspension of 10 g of the product of Example 7 in 150 ml of dimethylacetamide is charged with 0.94 g of N,N-dimethylaminopyridine and 28.6 g of the dicarbonate of formula

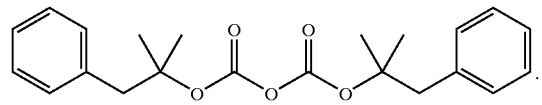

After 18 h, the reaction mixture is filtered through some MgSO$_4$ and the filtrate is concentrated. The crude product is precipitated with water, collected by filtration, washed with water and hexane and dried, yielding 14.4 g (89% of theory) of a green powder.

UV/VIS (dimethylsulfoxide): $\lambda_{max}$=679 nm.

TGA (heating rate 10° C./min): turning point of the degradation=169° C.; the product reconverts to the product according to Example 7.

EXAMPLES 15–29

The procedure is carried out in analogy to Examples 11 to 14, but using the following substances:

| Ex. | Educt acc. to Example | Dicarbonate | UV/VIS: λmax (solvent) | TGA (max.) [° C.] |
|---|---|---|---|---|
| 15 | 3 | 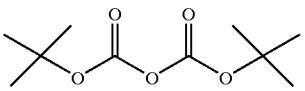 | 685 (THF) | 187 |
| 16 | 3 | 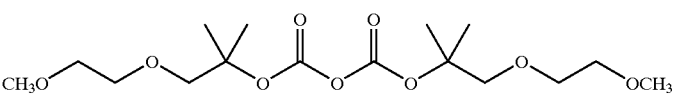 | 685 (THF) | 204 |
| 17 | 1 | 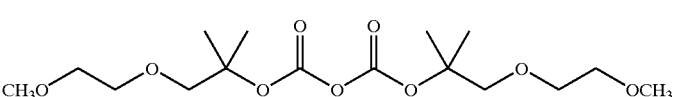 | 641, 680 (THF) | 196 |
| 18 | 4 | 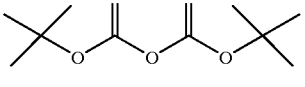 | 690 (CH$_2$Cl$_2$) | 146 |
| 19 | 1 | 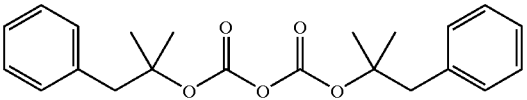 | 682 (DMSO) | 174 |
| 20 | 5 | 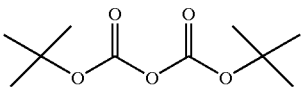 | 676 (DMSO) | 175 |
| 21 | 3 | 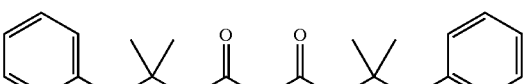 |  | 163 |
| 22 | 4 | 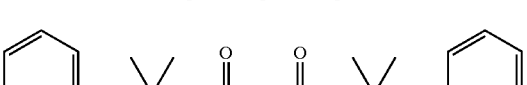 | 645, 687 (THF) | 154 |
| 23 | 10 | 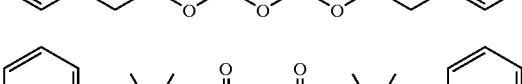 | 687 (DMSO) | 180 |
| 24 | 7 | 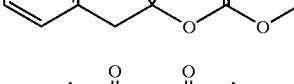 | 677 (DMSO) | 178 |
| 25 | 6 | 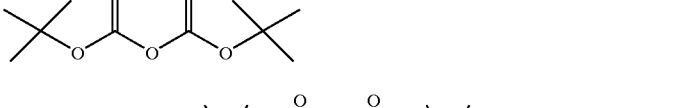 | 680 (DMSO) | 175 |
| 26 | 8 | 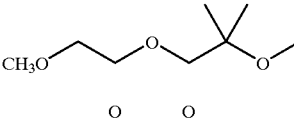 | 688 (NMP) | 186 |
| 27 | 8 | 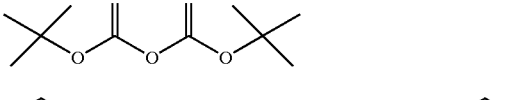 | 685 (CH$_2$Cl$_2$) | 177 |
| 28 | 9 | 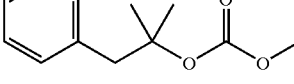 | 628, 678 (CH$_2$Cl$_2$) |  |

In all cases, the desired products are obtained in good purity with the cited $\lambda_{max}$ and TGA (turning point of the degradation), the products reconverting during heating to the materials according to Examples 1–10.

EXAMPLES 30

The following substances are filled into a brown glass vessel:

- 0.2 g of the product according to Example 19;
- 2 ml of cyclopentanone (OMM HTR-D2™/Olin Corp., US);
- 0.5 ml of diethylene glycol dimethyl ether (Diglyme™ puriss. Merck, DE);
- 0.5 g of polyhydroxystyrene (Maruca Lyncor™ $M_w$5300 /Maruzen Petrochemicals, JP);
- 0.1 g of hexamethoxymethylmelamine (Cymel 303™/ Dyno Cytec, US);
- 0.02 g of 2,4-trichloromethyl(4'methoxyphenyl)-6-triazine (Triazine A™/PCAS, FR).

The solution which is obtained after stirring for several hours is filtered through a 0.45 μm filter and is then spin-coated onto a glass plate (Corning 1737™). The coated plate is dried for 2 minutes at 100° C. on a heating plate and is then subjected to UV radiation (I-line 100 mJ/cm²) and aftertreated for 2 minutes at 100° C. The heating plate is then heated for 5 minutes to 200° C., the colour changing from bluish green to yellowish green.

UV/VIS: $\lambda_{max}$=555 nm (transmission: T=60%).

EXAMPLE 31

The procedure is carried out in analogy to Example 30, but using the product of Example 24 instead of the product according to Example 19.

UV/VIS: $\lambda_{max}$=545 nm (T=75%).

EXAMPLE 32

The procedure is carried out in analogy to Example 30, but using the product of Example 27 instead of the product of Example 19. UV/VIS: $\lambda_{max}$=542 nm (T=60%).

EXAMPLE 33

The procedure is carried out in analogy to Example 32, but using the product of Example 28 instead of the product of Example 27. UV/VIS: $\lambda_{max}$=542 nm (T=64%). Compared to Example 32, the colour is markedly closer to the target value for colour filters.

EXAMPLE 34

The procedure is carried out in analogy to Example 30, but using the product of Example 29 instead of the product of Example 19. UV/VIS: $\lambda_{max}$=545 nm (T=53%).

What is claimed is:

1. A compound of formula

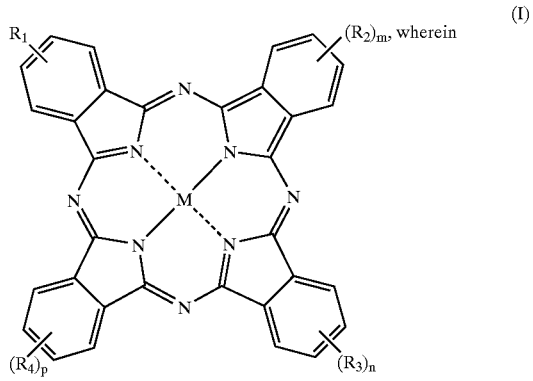
(I)

m, n and p are each independently of one another 0 or 1, $R_1$, $R_2$, $R_3$ and $R_4$ are each independently of one another a group of formulae

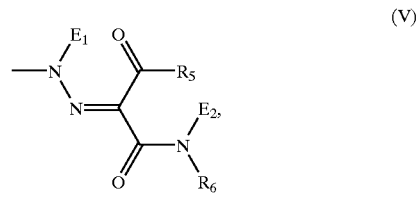
(V)

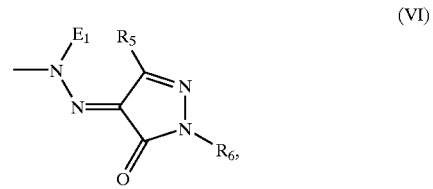
(VI)

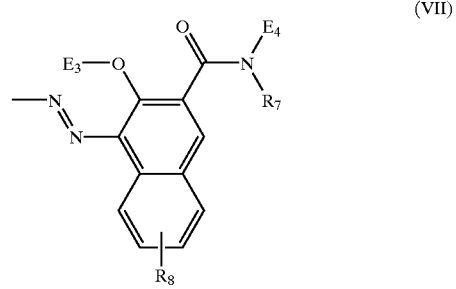
(VII)

or a tautomer thereof, $R_5$ is $C_1$–$C_{12}$alkyl, $C_1$–$C_{12}$alkoxy, cyano or

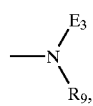 (VIII)

$R_6$, $R_7$ and $R_9$ are H, $E_5$, $C_1$–$C_{12}$alkyl,

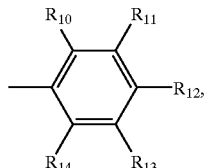 (IX)

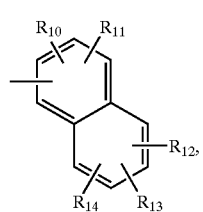 (X)

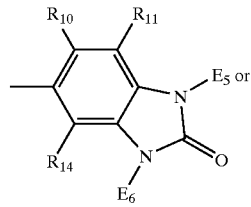 (XI)

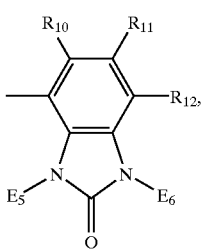 (XII)

$R_8$ is H, halogen, $C_1$–$C_{12}$alkyl or $C_1$–$C_{12}$alkoxy,
$R_{10}$, $R_{11}$, $R_{12}$, $R_{13}$ and $R_{14}$ are each independently of one another H, $C_1$–$C_{12}$alkyl, $C_1$–$C_{12}$alkoxy, trifluoromethyl, nitro, halogen or

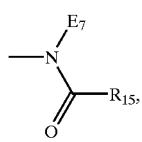 (XIII)

$R_{15}$ is $C_1$–$C_{12}$alkyl, or $C_6$–$C_{10}$aryl which is unsubstituted or substituted by 1 to 3 substituents selected from the group consisting of $C_1$–$C_{12}$alkyl, $C_1$–$C_{12}$alkoxy, trifluoromethyl, nitro and halogen, M is two hydrogen atoms or a divalent metal, oxometal, halogenometal or hydroxymetal, where the divalent metal may be additionally coordinated at one or two identical or different neutral ligands, and $E_1$, $E_2$, $E_3$, $E_4$, $E_5$, $E_6$ and $E_7$ are each independently of one another hydrogen or a group of formula

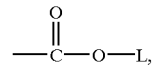 (XIV)

where at least one group $E_1$, $E_2$, $E_3$, $E_4$, $E_5$, $E_6$ or $E_7$ in a group $R_1$, $R_2$, $R_3$ or $R_4$ is not hydrogen, and L is any group suitable for solubilising.

2. A compound according to claim 1, wherein M is $H_2$, Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II), Pb(II), V(IV)O, Mn(IV)O, Zr(IV)O, Ti(IV)O, Fe(III)Cl, In(III)Cl, Ce(III)Cl, Al(III)OH, Cr(III)OH, Bi(III)OH or Zr(IV)(OH)$_2$.

3. A compound according to claim 1, wherein L is a group of formula

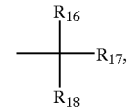

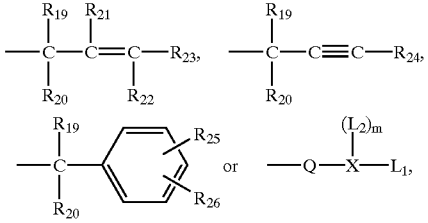

wherein
$R_{16}$, $R_{17}$ and $R_{18}$ are each independently of one another $C_1$–$C_6$alkyl,
$R_{19}$ and $R_{20}$ are each independently of the other $C_1$–$C_6$alkyl; $C_1$–$C_6$alkyl which is interrupted by O, S or N(R$_{27}$)$_2$; phenyl or biphenyl which is unsubstituted or substituted by $C_1$–$C_6$alkyl, $C_1$–$C_6$-alkoxy, halogen, cyano or nitro,
$R_{21}$, $R_{22}$ and $R_{23}$ are each independently of one another hydrogen or $C_1$–$C_6$alkyl,
$R_{24}$ is hydrogen, $C_1$–$C_6$alkyl or a group of formula

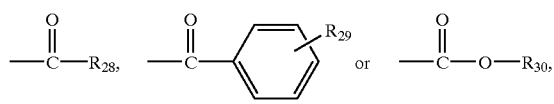

$R_{25}$ and $R_{26}$ are each independently of the other hydrogen, $C_1$–$C_6$alkyl, $C_1$–$C_6$alkoxy, halogen, cyano, nitro, N(R$_{27}$)$_2$; phenyl which is unsubstituted or substituted by halogen, cyano, nitro, $C_1$–$C_6$alkyl or $C_1$–$C_6$alkoxy,
$R_{27}$ and $R_{28}$ are $C_1$–$C_6$alkyl, $R_{29}$ is hydrogen or $C_1$–$C_6$alkyl, and $R_{30}$ is hydrogen, $C_1$–$C_6$alkyl, unsubstituted or $C_1$–$C_6$alkyl-substituted phenyl,
Q is p,q-$C_2$–$C_6$alkylene which is unsubstituted or mono- or polysubstituted $C_1$–$C_6$alkoxy, $C_1$–$C_6$alkythio or $C_2$–$C_{12}$dialkylamino, p and q being different position numbers, X is a heteroatom selected from the group consisting of N, O or S, wherein m, if X=O or S, is the number 0 and, if X=N, is the number 1, and $L_1$ and $L_2$ are each independently of the other $C_1$–$C_6$alkyl or [-(p',q'-$C_2$–$C_6$alkylene)-Z—]$_n$—$C_1$–$C_6$alkyl, each of which is unsubstituted or mono- or polysubstituted by $C_1$–$C_{12}$alkoxy, $C_1$–$C_{12}$alkylthio, $C_2$–$C_{24}$dialkylamino, $C_6$–$C_{12}$aryloxy, $C_6$–$C_{12}$arylthio, $C_7$–$C_{24}$alkylarylamino or $C_{12}$–$C_{24}$dialkylamino, wherein n is a number from 1 to 1000, p' and q' are different position numbers, each Z is independently of the others a heteroatom O, S or $C_1$–$C_{12}$alkyl-substituted N, and $C_2$–$C_6$alkylene may be identical or different in the repeating units [—$C_2$–$C_6$alkylene-Z—], and $L_1$ and $L_2$ may be saturated or unsaturated 1 to 10 times, and may be uninterrupted or interrupted at any position by 1 to 10 groups selected from the group consisting of —(C=O)— and —$C_6H_4$—, and may carry no, or from 1 to 10, additional substituents selected from the group consisting of halogen, cyano or nitro.

4. A compound according to claim 3, wherein L is $C_1$–$C_6$alkyl, $C_2$–$C_6$alkenyl or

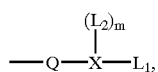

wherein

Q is $C_2$–$C_4$alkylene, and $L_1$ and $L_2$ are [—$C_2$–$C_{12}$alkylene-Z—]$_n$—$C_1$–$C_{12}$alkyl, or $C_1$–$C_{12}$alkyl which is mono- or polysubstituted by $C_1$–$C_{12}$alkoxy, $C_1$–$C_{12}$alkythio or $C_2$–$C_{24}$dialkylamino.

5. A compound of formula (I) according to claim 4, wherein L is $C_4$–$C_5$alkyl, $C_3$–$C_6$alkenyl or

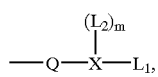

wherein Q is $C_2$–$C_4$alkylene, X is O, and m is 0, and $L_1$ is [—$C_2$–$C_{12}$alkylene-O—]$_n$—$C_1$–$C_{12}$alkyl, or $C_1$–$C_{12}$alkyl which is mono- or polysubstituted by $C_1$–$C_{12}$alkoxy.

6. A process for the preparation of a compound of formula

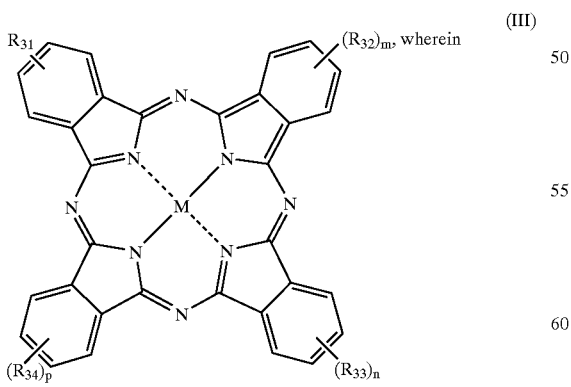

(III)

m, n and p are each independently of one another 0 or 1, $R_{31}$, $R_{32}$, $R_{33}$ and $R_{34}$ are each independently of one another a group of formulae

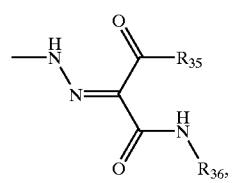

(XV)

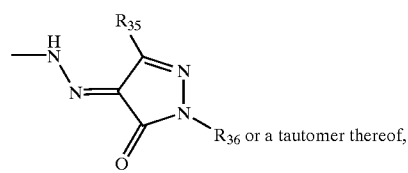

(XVI)

$R_{36}$ or a tautomer thereof, $R_{35}$ is $C_1$–$C_{12}$alkyl, $C_1$–$C_{12}$alkoxy, cyano or NHR$_{39}$, $R_{36}$, $R_{37}$ and $R_{39}$ are H, $C_1$–$C_{12}$alkyl,

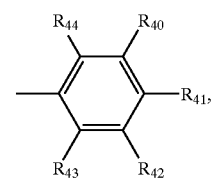

(XVII)

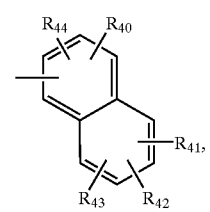

(XVIII)

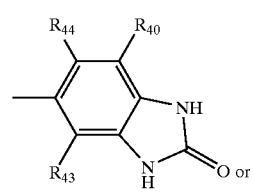

(XIX)

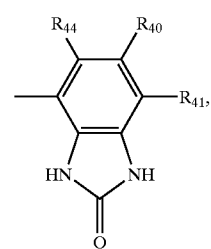

(XX)

$R_{38}$ is H, halogen, $C_1$–$C_{12}$alkyl or $C_1$–$C_{12}$alkoxy, $R_{40}$, $R_{41}$, $R_{42}$, $R_{43}$ and $R_{44}$ are each independently of one another H, $C_1$–$C_{12}$alkyl, $C_1$–$C_{12}$alkoxy, trifluoromethyl, nitro, halogen or

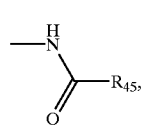

(XXI)

$R_{45}$ is $C_1$–$C_{12}$alkyl, or $C_6$–$C_{10}$aryl which is unsubstituted or substituted by 1 to 3 substituents selected from $C_1$–$C_{12}$alkyl, $C_1$–$C_{12}$alkoxy, trifluoromethyl, nitro and halogen, and M is two hydrogen atoms or a divalent metal, oxometal, halogenometal or hydroxymetal, it being possible for the divalent metal to be additionally coordinated at one or two identical or different neutral ligands, which comprises heating a material, which contains in the mass or in its pores a compound of formula (I), or which is coated on its surface with a compound of formula (I), to a temperature of from 50 to 250° C.

7. A process for the preparation of a compound of formula (III) according to claim 6, which comprises heating a solution of 0.01 to 99% by weight of the compound of formula (I) according to claim 1 in a solvent to 50 to 250° C.

8. A compound of formula

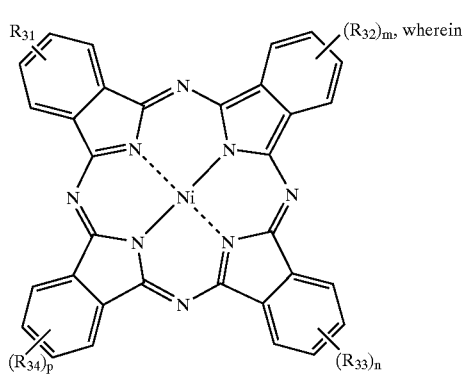

(IV)

m, n and p are each independently of one another 0 or 1, $R_{31}$, $R_{32}$, $R_{33}$ and $R_{34}$ are each independently of one another a group of formulae

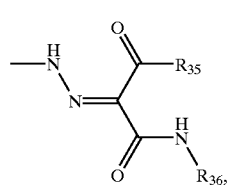

(XV)

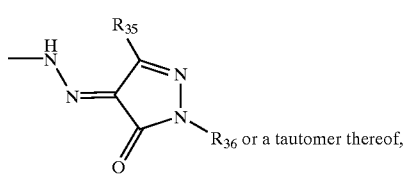

(XVI) or a tautomer thereof, $R_{35}$ is $C_1$–$C_{12}$alkyl, $C_1$–$C_{12}$alkoxy, cyano or $NHR_{39}$, $R_{36}$, $R_{37}$ and $R_{39}$ are H, $C_1$–$C_{12}$alkyl,

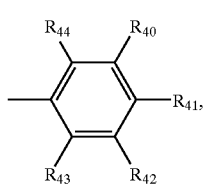

(XVII)

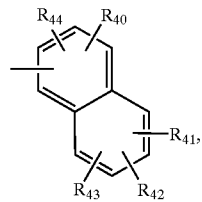

(XVIII)

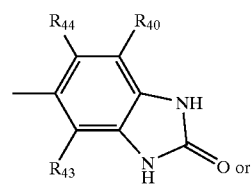

(XIX)

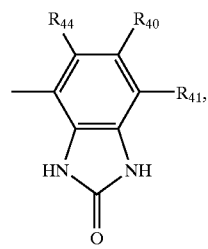

(XX)

$R_{38}$ is H, halogen, $C_1$–$C_{12}$alkyl or $C_1$–$C_{12}$alkoxy, $R_{40}$, $R_{41}$, $R_{42}$, $R_{43}$ and $R_{44}$ are each independently of one another H, $C_1$–$C_{12}$alkyl, $C_1$–$C_{12}$alkoxy, trifluoromethyl, nitro, halogen or

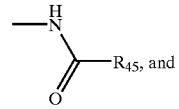

(XXI)

$R_{45}$ is $C_1$–$C_{12}$alkyl, or $C_6$–$C_{10}$aryl which is unsubstituted or substituted by 1 to 3 substituents selected from the group consisting of $C_1$–$C_{12}$alkyl, $C_1$–$C_{12}$alkoxy, trifluoromethyl, nitro and halogen.

9. A compound according to claim 3, wherein M is $H_2$, Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II), Pb(II), V(IV)O, Mn(IV)O, Zr(IV)O, Ti(IV)O, Fe(III)Cl, In(III)Cl, Ce(III)Cl, Al(III)OH, Cr(III)OH, Bi(III)OH or Zr(IV)(OH)$_2$.

10. A compound according to claim 4, wherein M is $H_2$, Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II), Pb(II), V(IV)O, Mn(IV)O, Zr(IV)O, Ti(IV)O, Fe(III)Cl, In(III)Cl, Ce(III)Cl, Al(III)OH, Cr(III)OH, Bi(III)OH or Zr(IV)(OH)$_2$.

11. A compound according to claim 5, wherein M is $H_2$, Cu(II), Zn(II), Fe(II), Ni(II), Ru(II), Rh(II), Pd(II), Pt(II), Mn(II), Mg(II), Be(II), Ca(II), Ba(II), Cd(II), Hg(II), Sn(II), Co(II), Pb(II), V(IV)O, Mn(IV)O, Zr(IV)O, Ti(IV)O, Fe(III)Cl, In(III)Cl, Ce(III)Cl, Al(III)OH, Cr(III)OH, Bi(III)OH or Zr(IV)(OH)$_2$.

* * * * *